United States Patent
Lim et al.

(10) Patent No.: US 10,133,529 B2
(45) Date of Patent: Nov. 20, 2018

(54) ELECTRONIC APPARATUS FOR DISPLAY OF NOTIFICATION INFORMATION, AND OPERATING METHOD THEREOF

(71) Applicant: Samsung Electronics Co., Ltd., Gyeonggi-do (KR)

(72) Inventors: Dongkyu Lim, Seoul (KR); Seunghwan Lee, Seoul (KR); Seonhwa Kim, Seoul (KR); Kyungdae Park, Seoul (KR); Mijung Park, Gyeonggi-do (KR); Wansoo Lim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/996,703

(22) Filed: Jan. 15, 2016

(65) Prior Publication Data

US 2016/0224299 A1 Aug. 4, 2016

(30) Foreign Application Priority Data

Jan. 16, 2015 (KR) .................. 10-2015-0008094

(51) Int. Cl.
| | |
|---|---|
| *G06F 3/14* | (2006.01) |
| *H04M 1/725* | (2006.01) |
| *H04M 19/04* | (2006.01) |
| *H04W 68/00* | (2009.01) |
| *G06F 3/0481* | (2013.01) |
| *G06F 3/0488* | (2013.01) |
| *H04M 1/21* | (2006.01) |

(52) U.S. Cl.
CPC ............ *G06F 3/14* (2013.01); *G06F 3/0481* (2013.01); *G06F 3/0488* (2013.01); *H04M 1/72519* (2013.01); *H04M 19/048* (2013.01); *H04W 68/00* (2013.01); *G06F 2203/04803* (2013.01); *H04M 1/21* (2013.01); *H04M 2250/22* (2013.01)

(58) Field of Classification Search
None
See application file for complete search history.

(56) References Cited

U.S. PATENT DOCUMENTS 9,300,347 B1 * 3/2016 Coverstone .......... H04B 1/3888
9,471,145 B2 * 10/2016 Langlois ................ G06F 3/017
(Continued)

FOREIGN PATENT DOCUMENTS

| EP | 1 227 388 | 7/2002 |
|---|---|---|
| EP | 1 780 634 | 5/2007 |

(Continued)

OTHER PUBLICATIONS

International Search Report dated Jun. 17, 2016 issued in counterpart application No. PCT/KR2016/000439, 10 pages.

(Continued)

*Primary Examiner* — Hilina K Demeter
(74) *Attorney, Agent, or Firm* — The Farrell Law Firm, P.C.

(57) ABSTRACT

An electronic device and an operation method of providing event notification on a display of the electronic device are disclosed. The method includes detecting a notification event, determining at least one section corresponding to the notification event among a plurality of sections of an edge area extended from a main area of a display unit, and displaying a color light in the determined section.

20 Claims, 21 Drawing Sheets

(56) References Cited

U.S. PATENT DOCUMENTS

| | | | |
|---|---|---|---|
| 2004/0027364 A1 | 2/2004 | Ohtani et al. | |
| 2005/0190196 A1 | 9/2005 | O'Neil et al. | |
| 2011/0151935 A1* | 6/2011 | Oksman ................ | G06F 1/1624 |
| | | | 455/566 |
| 2012/0131519 A1 | 5/2012 | Jitkoff | |
| 2012/0212430 A1 | 8/2012 | Jung et al. | |
| 2013/0106753 A1* | 5/2013 | Lee ....................... | G06F 3/0488 |
| | | | 345/173 |
| 2013/0281169 A1* | 10/2013 | Coverstone ......... | H04M 1/0283 |
| | | | 455/575.8 |
| 2014/0229886 A1 | 8/2014 | Ding et al. | |
| 2014/0282214 A1* | 9/2014 | Shirzadi .............. | G06F 3/04883 |
| | | | 715/781 |
| 2015/0011263 A1* | 1/2015 | Itamoto ................ | G06F 3/0488 |
| | | | 455/566 |
| 2015/0155903 A1* | 6/2015 | Jang .................... | H04B 1/3888 |
| | | | 455/575.8 |
| 2015/0160699 A1* | 6/2015 | Choi .................... | G06F 1/1643 |
| | | | 345/173 |

FOREIGN PATENT DOCUMENTS

| | | |
|---|---|---|
| EP | 2 282 491 | 2/2011 |
| EP | 2 288 126 | 2/2011 |
| EP | 2 806 333 | 11/2014 |

OTHER PUBLICATIONS

European Search Report dated Jun. 29, 2016 issued in counterpart application No. 16151483.1-1972, 7 pages.

* cited by examiner

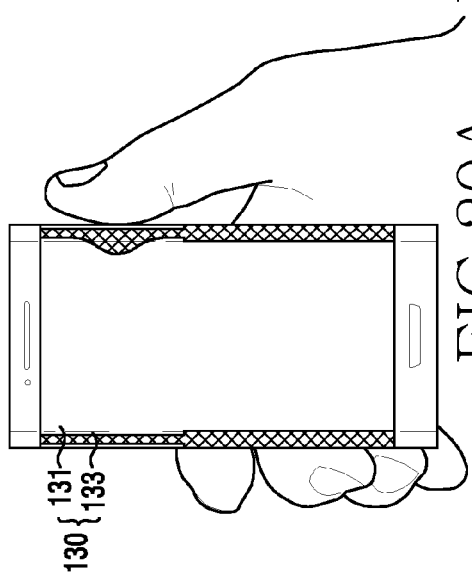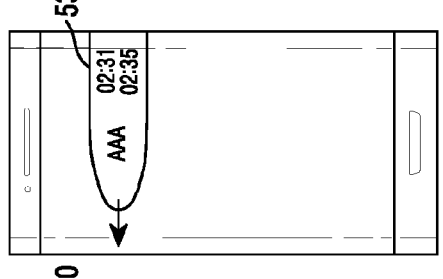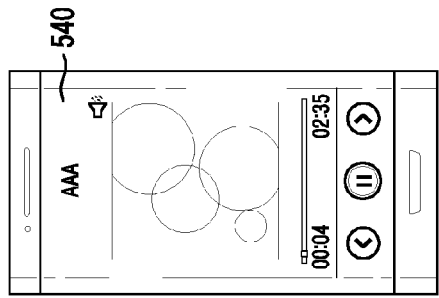
FIG.20A  FIG.20B  FIG.20C  FIG.20D
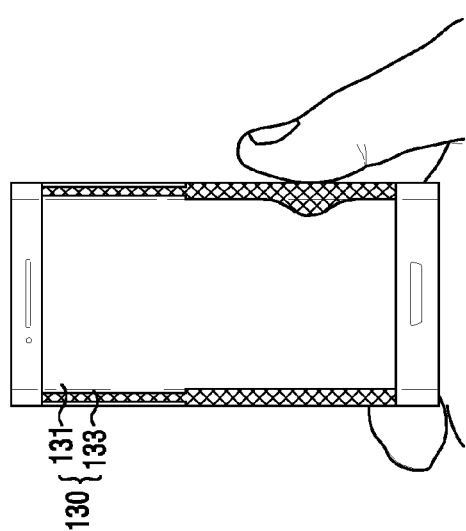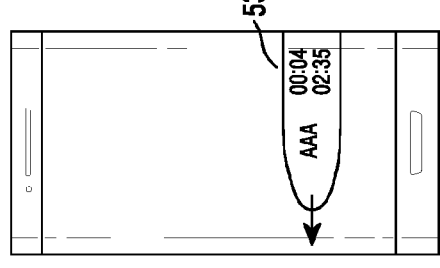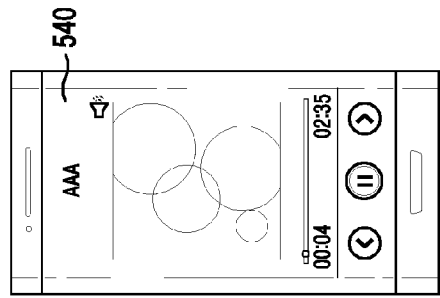
FIG.20E  FIG.20F  FIG.20G  FIG.20H

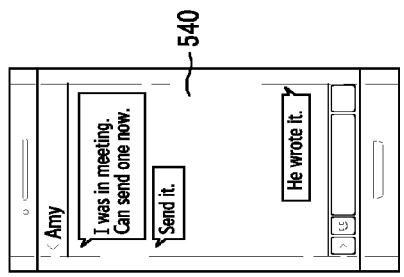
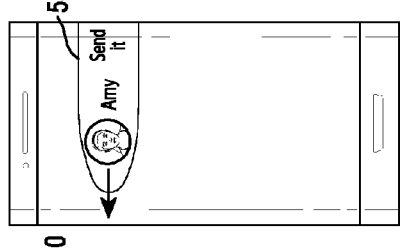
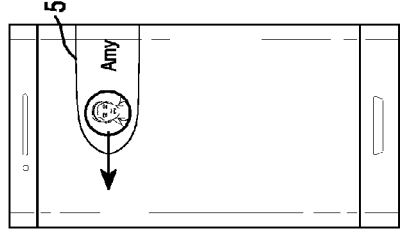
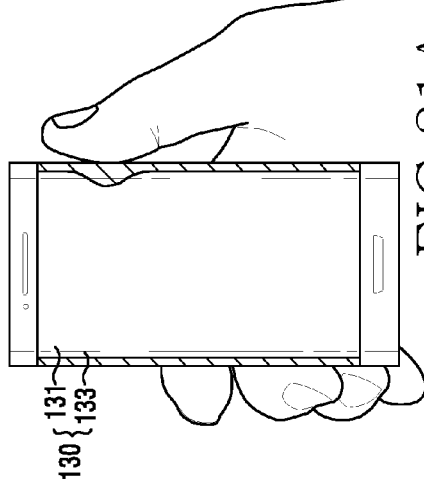
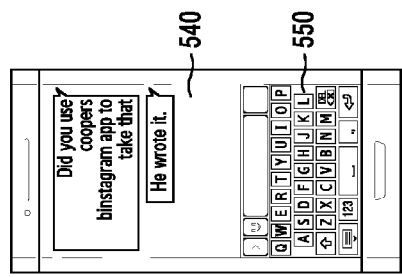

ELECTRONIC APPARATUS FOR DISPLAY OF NOTIFICATION INFORMATION, AND OPERATING METHOD THEREOF

PRIORITY

This application claims priority under 35 U.S.C. § 119(a) to Korean Patent Application Serial No. 10-2015-0008094, which was filed in the Korean Intellectual Property Office on Jan. 16, 2015, the entire content of which is incorporated herein by reference.

BACKGROUND

1. Field of the Disclosure

The present disclosure relates to an electronic device and a method of displaying event notification on the display screen of the electronic device.

2. Description of the Related Art

Generally, an electronic device may perform multiple complex functions. For example, an electronic device may perform a voice communication function, a data communication function, a data output function, a data storage function, an image photographing function, a voice recording function, and the like. The electronic device includes a display unit and displays information via the display unit. When the display unit has been activated, the electronic device displays the information by activating the display unit. When this occurs, the electronic device may provide a notification for the information and then display the information.

However, the electronic device may not effectively provide the notification to the user of the electronic device. For example, the electronic device may output an optical signal by a light emitting device such as an LED, however, the electronic device cannot provide distinguishing attributes of the information by using an optical signal. The electronic device may generate an audio signal or a vibration to provide distinguishing attributes of the information, however, the audio signal or the vibration may cause annoyance to someone nearby other than a user of the electronic device. The electronic device may display information to provide distinguishing attributes in a pop-up window, however, that information may be exposed to someone nearby other than the user of the electronic device.

SUMMARY

Accordingly, an aspect of the present disclosure provides an electronic device which can efficiently display information and an operation method thereof.

Another aspect of the present disclosure also provides an electronic device which can efficiently provide a notification for information and an operation method thereof.

According to an aspect of the present disclosure, an electronic device includes a display unit including a main area and an edge area which is extended from the main area and is divided into a plurality of sections and a controller functionally connected to the display unit, wherein the controller detects a notification event, determines at least one section corresponding to the notification event among the sections, and displays a color light in the determined section.

According to an aspect of the present disclosure, an operation method of an electronic device includes detecting a notification event, determining at least one section corresponding to the notification event among a plurality of sections of an edge area extended from a main area and displaying a color light in the determined section.

According to an aspect of the present disclosure, an electronic device and an operation method thereof are presented in which a display unit of an electronic device includes a main area and an edge area. When the main area is deactivated, the electronic device provides the notice for the information by outputting a color light through the edge area, thereby preventing annoyance to a person nearby who is not the user of the electronic device. Further, it can prevent exposing the information to a person who is not the user of the electronic device. Further, the electronic device applies a different color, pattern, or position in the edge area for the color light, thereby distinguishing the information. Accordingly, the electronic device can effectively provide a notice for the information and efficiently display the information.

BRIEF DESCRIPTION OF THE DRAWINGS

The above and other aspects, features, and advantages of the present disclosure will be more apparent from the following detailed description taken in conjunction with the accompanying drawings, in which:

FIGS. 8, 9, 10, 11, 12A-12B, 13A-13B, 14, 15, 16A-16B, 17A-17H, 18A-18H, 19A-19H, 20A-20H and 21A-21F are screen shot views for describing an information display method according to an embodiment of the present disclosure.

DETAILED DESCRIPTION

Figure 1:
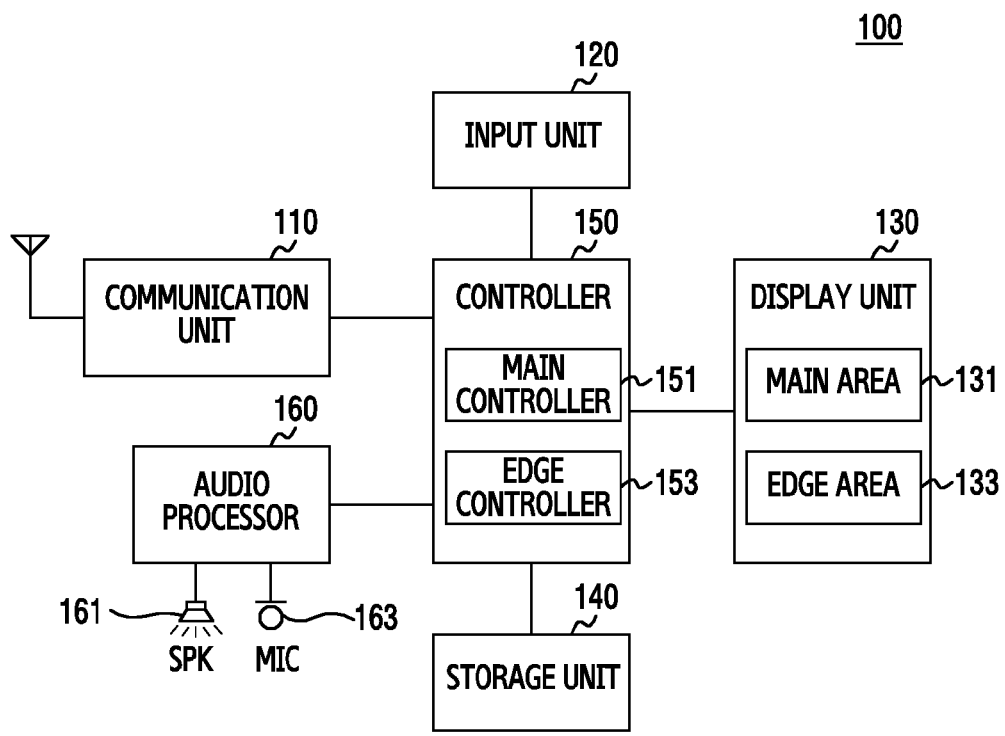
FIG. 1 is a block diagram illustrating an electronic device according to an embodiment of the present disclosure.

Hereinafter, various embodiments of the present disclosure will be described in detail with reference to the accompanying drawings. It is noted that identical reference numerals denote the same structural elements in the accompanying drawings. The detailed description of well known functions and structures in the art will be omitted to retain clarity of the subject matter of the present disclosure.

Figure 2A:
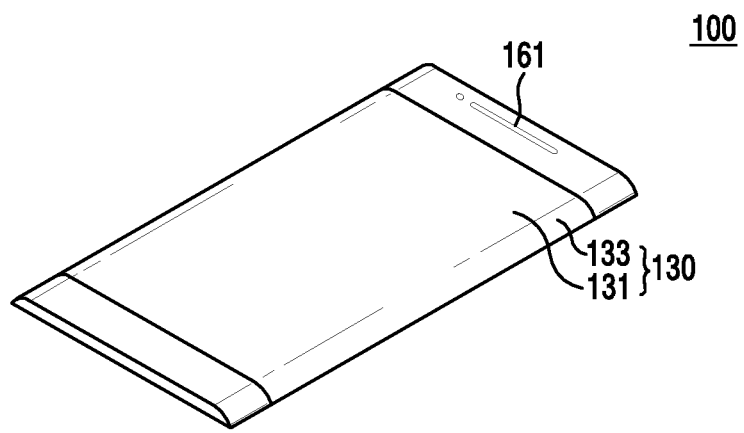
FIGS. 2A and 2B are perspective views illustrating an implementation of an electronic device according to an embodiment of the present disclosure.
Figure 2B:
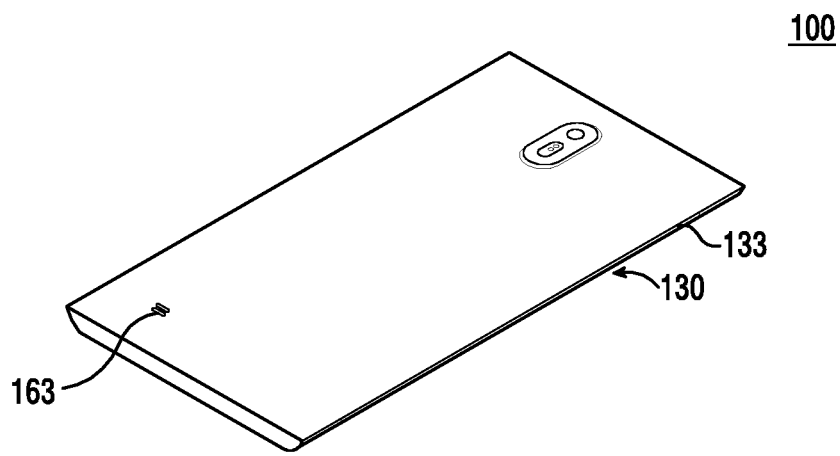

FIG. 1 is a block diagram illustrating an electronic device according to an embodiment of the present disclosure. FIGS. 2A and 2B are perspective views illustrating an implementation of an electronic device according to an embodiment of the present disclosure. FIG. 2A is a top perspective view of an electronic device and FIG. 2B is a bottom perspective view of an electronic device.

Referring to FIG. 1, an electronic device 100 of an embodiment of the present disclosure includes a communication unit 110, an input unit 120, a display unit 130, a storage unit 140, a controller 150 and an audio processor 160.

The communication unit 110 performs communication in the electronic device 100. The communication unit 110 may communicate with an external device in various communication schemes. For example, the external device may include an electronic device, a base station, a server, and a satellite. The communication unit 110 may perform at least one of wireless communication and wired communication. The communication unit 110 may access at least one among a mobile communication network and a data communication network. The various communication schemes may include long term evolution (LTE), wideband code division multiple access (WCDMA), global system for mobile communications (GSM), WiFi, bluetooth, and near field communications (NFC).

The input unit 120 generates input data in the electronic device 100. The input unit 120 may generate the input data corresponding to a user's input on the electronic device 100. Further, the input unit 120 may include at least one input means. For example, the input unit 120 may include a key pad, a dome switch, a physical button, a touch panel, a jog & shuttle dial, and a sensor.

The display unit 130 displays the display data. For example, the display unit 130 may include a liquid crystal display (LCD), a light emitting diode (LED) display, an organic led (OLED) display, a micro electro mechanical system (MEMS) display, and an electronic paper display. Herein, the display unit 130 may include a plurality of light emitting elements. Further, the display unit 130 may be implemented by a touch screen by being combined with the input unit 120.

The display unit 130 includes a main area 131 and an edge area 133. The main area 131 displays a display screen. Herein, the display screen may display at least one of an image and a text. The main area 131 is arranged on the front of the electronic device 100. The edge area 133 displays a color light. The edge area 133 is extended from the edge of the main area 131. That is, the edge area 133 may be extended from at least one among an upper surface, a lower surface, a left surface, and a right surface. Herein, the main area 131 and the edge area 133 may be integrally formed.

Herein, the edge area 133 may be tilted with respect to the surface of the main area 131. In other words, the edge area 133 may extend toward the rear surface of the electronic device 100 from the main area 131. That is, the edge area 133 may be arranged at a side of the electronic device 100. For example, the display unit 130 is manufactured to have flexibility, and then may be divided into the main area 131 and the edge area 133 as the display unit is bent. For example, as shown in FIG. 2A, the edge area 133 may be tilted to the outside of the main area 131. As shown in FIG. 2B, when the main area 131 is arranged toward an external bottom surface, a color light of the edge area 133 may be exposed to the side of the electronic device 100 and may be reflected to the external bottom surface. Also, the edge area 133 may be tilted towards the inside of the main area 131. When the main area 131 is exposed to the outside, a color light displayed on the edge area 133 may be exposed to the side of the electronic device 100 and may be reflected to the external bottom surface.

Herein, the main area 131 and the edge area 133 may be arranged on the same plane. That is, the edge area 133 may be arranged on the front of the electronic device 100. When the main area 131 is arranged against the external bottom surface, the color light of the edge area 133 may be exposed between the electronic device 100 and the external bottom surface, and may be reflected to the external bottom surface.

The storage unit 140 stores operation programs of the electronic device 100. The storage unit 140 may store a program for individually controlling the main area 131 and the edge area 133, and controlling the main area 131 and the edge area 133 by interconnecting them. Further, the storage unit 140 stores data generated while executing programs.

The controller 150 controls overall operations of the electronic device 100. The controller 150 may perform various functions. In addition, the controller 150 may control the display unit 130 and output display data. Herein, the controller 150 may individually control the main area 131 and the edge area 133, and control the main area 131 and the edge area 133 by interconnecting them. In addition, the controller 150 may detect a user input through the input unit 120 in response to the main area 131 and the edge area 133. Herein, the controller 150 may detect a touch in the main area 131 and the edge area 133. The controller 150 includes a main controller 151 and an edge controller 153.

The main controller 151 controls the main area 131. Specifically, the main controller 151 may execute control to output a display screen by activating the main area 131. Herein, the display screen may include at least one of an image and a text. Further, the main controller 151 may execute control to display an execution screen of a function in the main area 131. Also, the main controller 151 may deactivate the main area 131. For example, when a user input for deactivating the main area 131 occurs through the input unit 120, the main controller 151 may deactivate the main area 131. In addition, while activation of the main area 131 is maintained during a determined time interval, when there is no user input through the input unit 120, the main controller 151 may deactivate the main area 131.

The edge controller 153 controls the edge area 133. Specifically, the edge controller 153 may execute control to display a color light in the edge area 133. That is, when a main area 131 is deactivated, the edge controller 153 may execute control to display the color light in the edge area 133. When the main area 131 is deactivated during the execution of the function, the edge controller 153 may output a progression state of the function in the edge area 133. Further, when a notification event occurs while the main area 131 is deactivated, the edge controller 153 may execute control to display the color light corresponding to the notification event in the edge area 133. Herein, the edge controller 153 may execute control to change the color of the light in the edge area 133. Further, the edge controller 153 may execute control to display the color light by dividing the edge area 133 into a plurality of sections. Also, the edge controller 153 may execute control to extend display area of the color light.

The audio processor 160 processes an audio signal. The audio processor 160 includes a speaker 161 and a microphone 163. That is, the audio processor 160 may reproduce an audio signal output in the controller 150 through the speaker 161. In addition, the audio processor 160 may transfer an audio signal generated in the microphone 163 to the controller 150.

Figure 3:
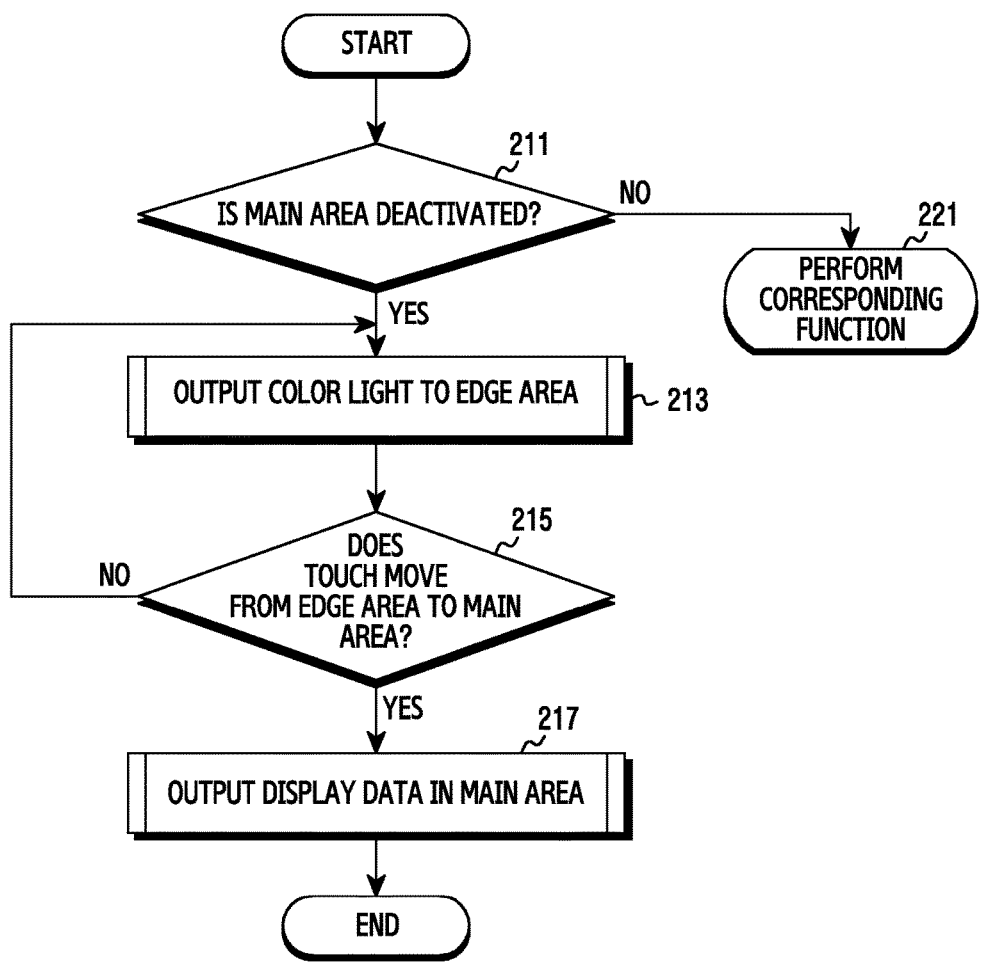
FIG. 3 is a flowchart illustrating an operation of an information display method according to an embodiment of the present disclosure.

FIG. 3 is a flow chart illustrating the operation of an information display method according to an embodiment of the present disclosure. Further, FIGS. 8, 9, 10, 11, 12A-12B, 13A-13B, 14, 15, 16A-16B, 17A-17H, 18A-18H, 19A-19H, 20A-20H and 21A-21F are screen shot views describing an information display method according to an embodiment of the present disclosure.

Referring to FIG. 3, an information display method according to the embodiment starts from step 211 in which the controller 150 detects deactivation when the main area 131 is deactivated in the display unit 130. For example, when a user input for deactivating the main area 131 occurs through the input unit 120, the controller 150 may deactivate the main area 131. In addition, while activation of the main area 131 is maintained during a determined time interval, when there is no user input through the input unit 120, the controller 150 may deactivate the main area 131.

Figure 8:
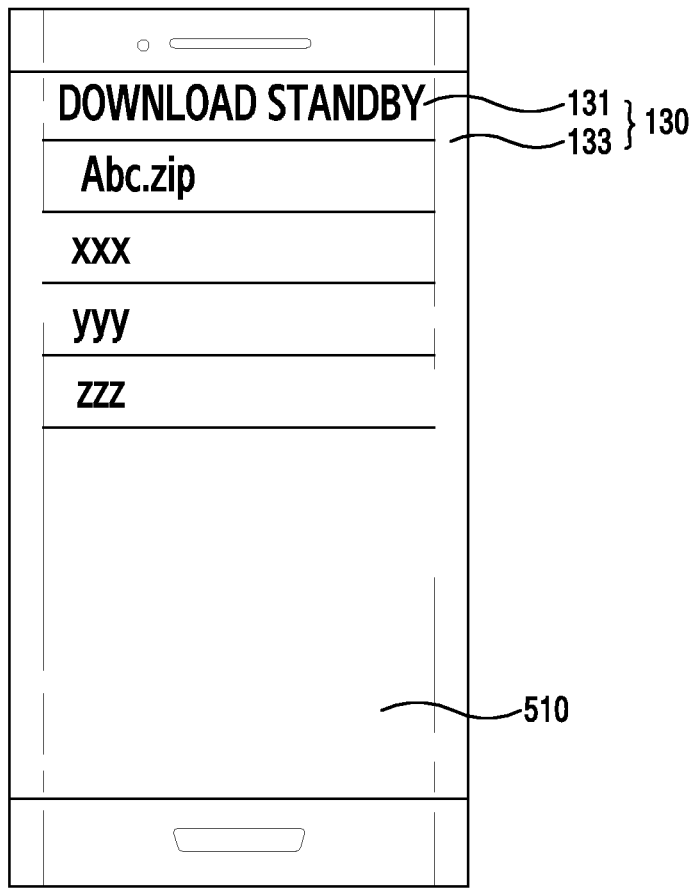
Figure 9:
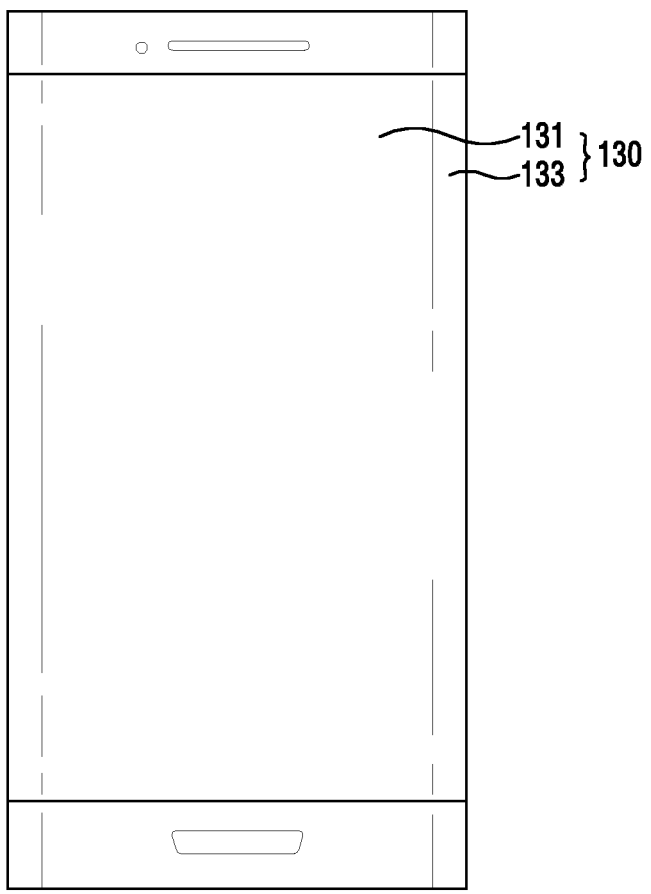

The controller 150 may execute control to output a display screen by activating the main area 131 as shown in FIG. 8. Herein, the controller 150 may perform a function and execute control to display an execution screen 510 of the function in the main area 131. Then, the controller 150 may deactivate the main area 131 as shown in FIG. 9. When the main area 131 is deactivated, the controller 150 may terminate the function. Further, when the main area 131 is deactivated, the controller 150 may stop the function. The controller 150 may continuously progress the function. That is, even though the main area 131 is deactivated, the controller 150 may progress the function. The controller 150 progresses the function by executing stored programs or routines that cause the function to progress.

Further, the controller 150 may deactivate the main area 131 by stopping the transmission of the electronic signal to the main area 131. Herein, the controller 150 may also deactivate the input unit 120 corresponding to the main area 131. Even though the main area 131 is deactivated in the display unit 130, the controller 150 does not deactivate the edge area 133. That is, the controller 150 may continuously activate the edge area 133. However, the controller 150 may turn off light-emitting elements corresponding in the edge area 133. Herein, the controller 150 may also continuously activate the input unit 120 corresponding to the main area 131.

Next, the controller 150 execute control to display a color light 520 in the edge area 133 in step 213. While the main area 131 is deactivated, the controller 150 may execute control to display the color light 520 in the edge area 133. When the main area 131 is deactivated, the controller 150 may execute control to display the color light 520 in the edge area 133 after standby. Further, the controller 150 may execute control to display the color light 520 in the edge area 133 overall. Further, the controller 150 may execute control to partially display the color light 520 in the edge area 133. To this end, the controller 150 may execute control to turn on at least a part among the light-emitting elements correspondingly in the edge area 133. Further, the controller 150 may control the light-emitting elements to adjust the color light 520. Herein, referring to FIG. 4, an operation in which the controller 150 executes control to display the color light 520 in the edge area 133 will be described in more detail.

Figure 4:
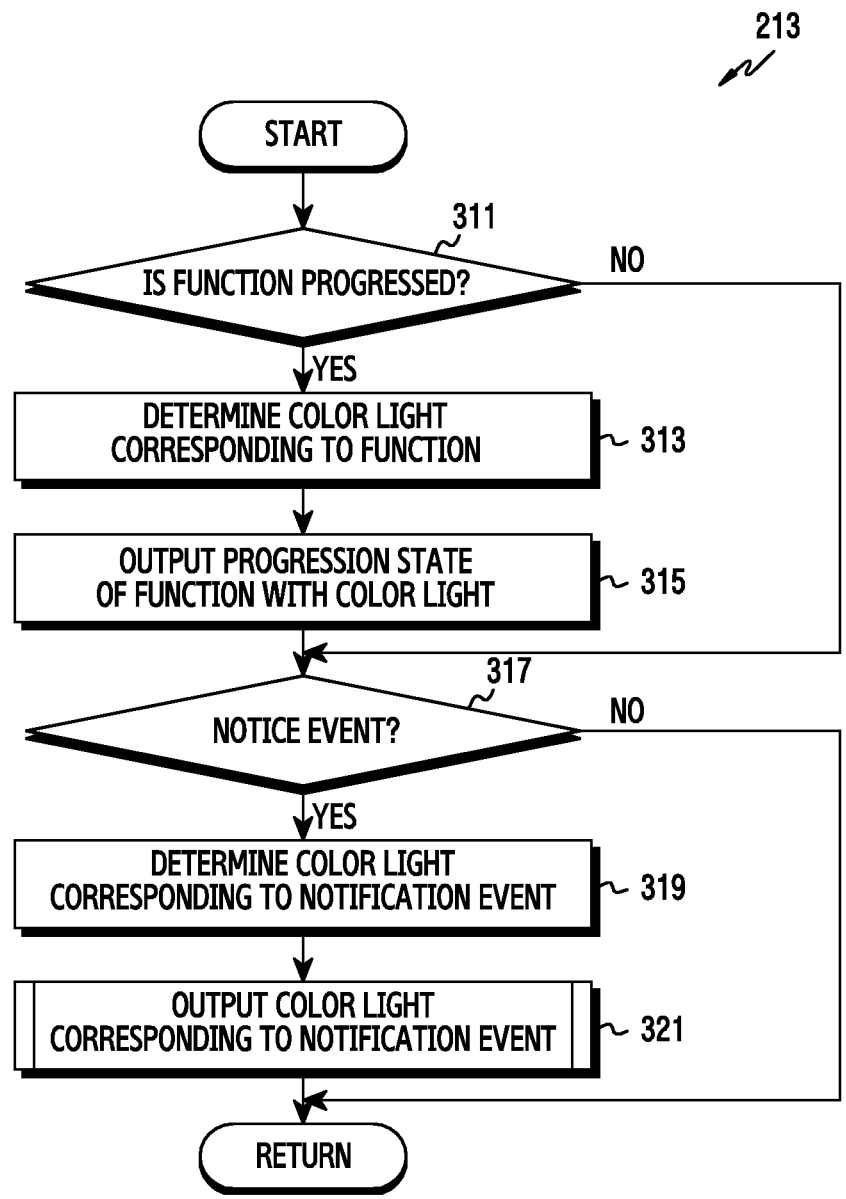
FIG. 4 is a flowchart illustrating an operation of displaying a color light in an edge area according to an embodiment of the present disclosure.

FIG. 4 is a flowchart illustrating the operation of displaying a color light in an edge area according to an embodiment of the present disclosure.

Referring to FIG. 4, the controller 150 determines whether a function is progressing in step 311. When the main area 131 is deactivated during the execution of the function, the function may be continuously progressed. That is, even though the main area 131 is deactivated, the controller 150 may continuously progress the function. Herein, during the execution of the function, the controller 150 may determine a starting point and a completion point of the function. For example, the function may include a health care function, a data transmission function, a data reception function, a data download function, a data upload function, a timer function, a stopwatch function, and a file reproduction function.

Next, when it is determined that the function is progressing in step 311, the controller 150 determines the color light 520 corresponding to the function in step 313. The controller 150 determines at least one of a color and a pattern corresponding to the function. Herein, at least one of the color and the pattern may be configured in the storage unit 140 corresponding to the function. Accordingly, the controller 150 may determine from the storage unit 140, at least one of the color and the pattern corresponding to the function.

Figure 10:
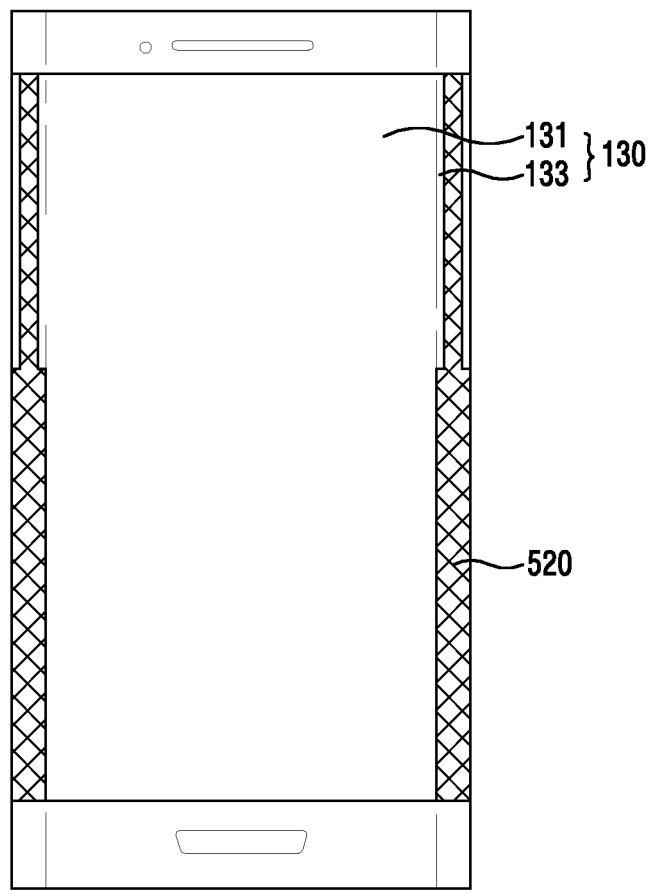

Next, the controller 150 executes control to display the color light 520 according to the progression state of the function in step 315. The controller 150 may change the color light 520 according to the amount of time the color light is displayed. Further, the controller 150 may execute control to display the color light 520 in the edge area 133 as shown in FIG. 10. That is, the controller 150 may execute control to display the color light 520 by dividing the edge area 133 into a progression section and a remaining section of the function. Herein, the controller 150 may determine the progression section from a starting point to a current point and determine the remaining section from the current point to a completion point. Further, the controller 150 may match one end of the edge area 133 with the starting point and may match another end of the edge area 133 to the completion point. Further, the controller 150 may divide the progression section and the remaining section in the edge area 133 with the color light 520.

For example, the controller 150 may execute control to widely display a width of the color light 520 corresponding to the progression section and may execute control to narrowly display a width of the color light 520 corresponding to the remaining section. In addition, the controller 150 may execute control to narrowly display a width of the color light 520 corresponding to the progression section and may execute control to widely display a width of the color light 520 corresponding to the remaining section. Also, the controller 150 may execute control to display the color light 520 corresponding to the progression section and may not execute control to display the color light 520 corresponding to the remaining section. The controller 150 may not execute control to display the color light 520 corresponding to the progression section and may execute control to display the color light 520 corresponding to the remaining section. Further, when the progression of the function is completed, the controller 150 may execute control to display the color light 520 in the edge area 133 overall.

When a notification event occurs, the controller 150 detects the occurrence of the notification event in step 317. Herein, when it is determined that the function is not being progressed in step 311, the controller 150 may detect the notification event while in standby. That is, the controller 150 may generate the notification event while in standby as shown in FIG. 9. Further, after outputting the progression state of the function in step 315, the controller 150 may detect the notification event. That is, the controller 150 may generate the notification event while executing control to display the progression state of the function with the color light as shown in FIG. 10.

The notification event includes a communication event and a schedule event. The communication event may occur in the communication unit 110. When receiving a call, an email, or a message, the communication unit 110 may generate the communication event. For example, the communication unit 110 may receive a message through a Short Messaging Service (SMS), a Multimedia Messaging Service (MMS), or a Social Networking Service (SNS). The schedule event may occur in the controller 150. When a schedule event or an alarm occurs, the controller 150 recognizes the schedule event or alarm. A specific time may be set as a schedule event or an alarm and that time is stored in the storage unit 140. Accordingly, the controller 150 can retrieve the set time of a schedule event or an alarm from the storage unit 140.

Next, the controller 150 determines the color light 520 corresponding to the notification event in step 319. The controller 150 may determine the color light 520 according to attributes of the notification event. Further, the controller 150 may determine the color light 520 according to the caller of the communication event. Also, the controller 150 may determine at least one of a color and a pattern corresponding to the notification event. Herein, at least one of the color and the pattern may be configured in the storage unit 140 corresponding to the notification event. Accordingly, the controller 150 may determine, from the storage unit 140, at least one of the color and the pattern corresponding to the notification event.

Figure 5:
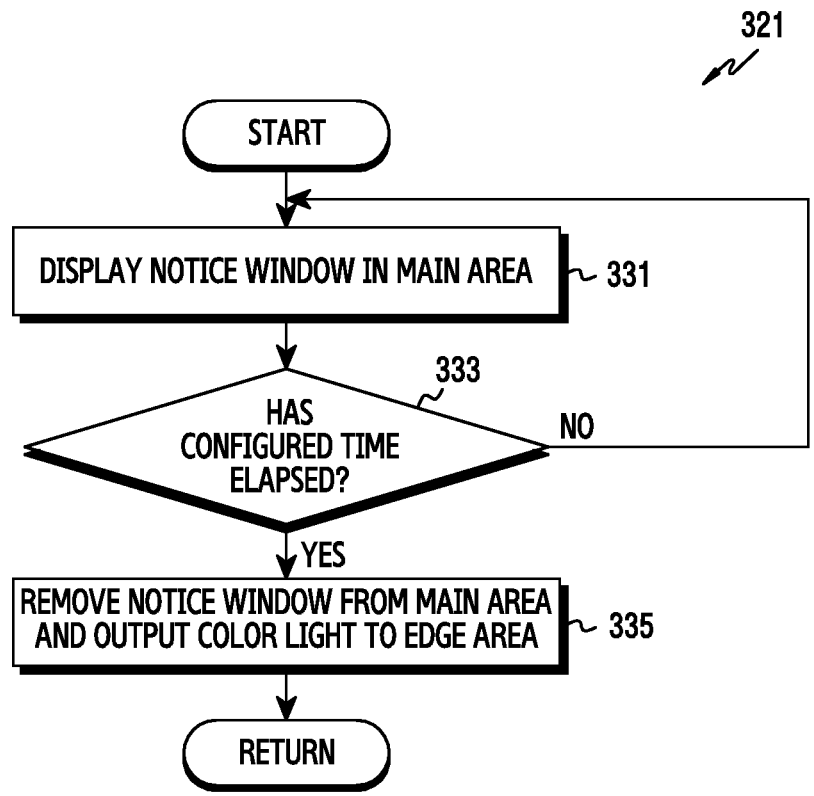
FIG. 5 is a flowchart illustrating an operation of displaying a notice window according to an embodiment of the present disclosure.
Figure 6:
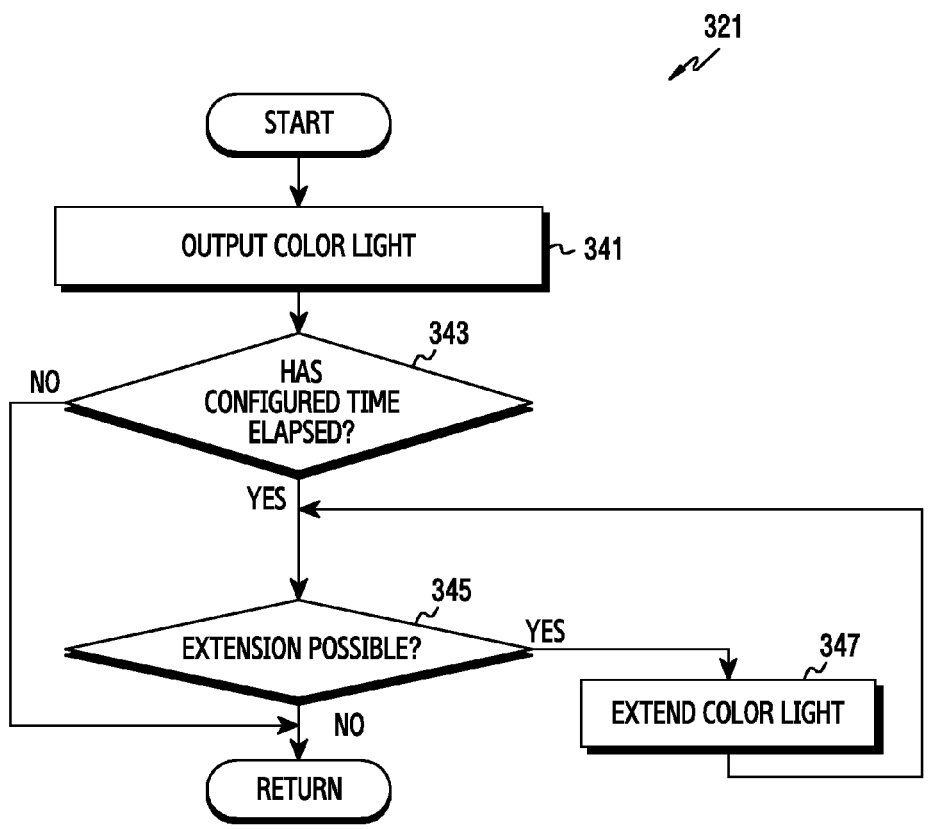
FIG. 6 is a flowchart illustrating an operation for extending the time of displaying a color light according to an embodiment of the present disclosure.
Figure 11:
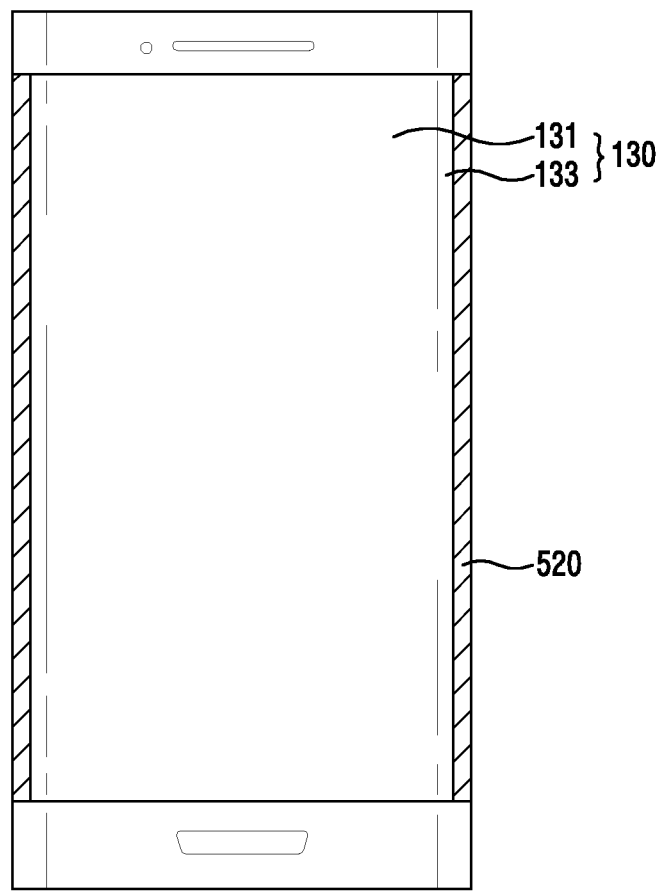

Next, the controller 150 executes control to display the color light 520 corresponding to the communication event in step 321. The controller 150 executes control to display the color light 520 in the edge area 133 overall as shown in FIG. 11. For example, a width of the color light 520 may be narrower than a width of the edge area 133. Then, the controller 150 returns to executing the operations defined in the flowchart of FIG. 3. With reference to FIGS. 5 and 6, the operation of the controller 150 executing control to display the color light 520 corresponding to the notification event will be described in more detail.

FIG. 5 is a flowchart illustrating the operation of displaying a color light according to an embodiment of the present disclosure.

Figure 12A:
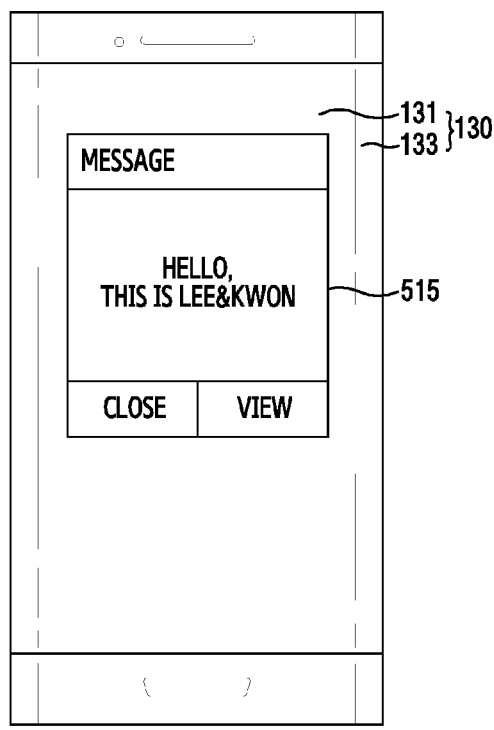

Referring to FIG. 5, the controller 150 executes control to display a notice window 515 in the main area 131 in step 331. The controller 150 may activate the main area 131. Herein, the controller 150 may activate a part the main area 131. That is, the controller 150 may not activate the main area 131 overall and activate only a part of area of the main area 131. Further, the controller 150 executes control to display the notice window 515 as shown in FIG. 12A. The controller 150 executes control to display the notice window 515 through a pop-up window. The controller 150 executes control to display notice information in the notice window 515. Herein, the controller 150 may execute control to display at least a part of the information of the notification event as the notice information.

Figure 12B:
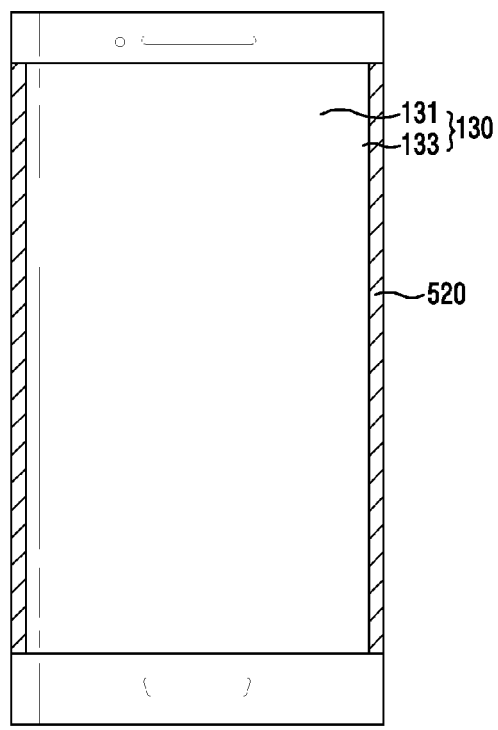

Next, when a configured time has elapsed, the controller 150 detects the elapsing of time in step 333. Further, the controller 150 removes the notice window 515 from the main area 131 in step 335. That is, the controller 150 executes control to display the notice window 515 in the main area 131 during a determined time interval, and then removes the notice window 515 from the main area 131. The controller 150 may again deactivate the main area 131. Also, the controller 150 executes control to display a color light 520 in the edge area 131. The controller 150 executes control to display the color light 520 in the edge area 133 as shown in FIG. 12B. Herein, a width of the color light 520 may be narrower than a width of the edge area 133. Further, the width of the color light 520 may be identical to the width of the edge area 133. Then, the controller 150 returns executing the operations shown in the flowchart in FIG. 4.

FIG. 6 is a flowchart illustrating the operation of displaying a color light in FIG. 4.

Referring to FIG. 6, the controller 150 executes control to display the color light 520 corresponding to the notification event in step 341. The controller 150 executes control to display the color light 520 in the edge area 133 as shown in FIGS. 11 and 12B. Herein, a width of the color light 520 may be narrower than a width of the edge area 133.

Next, when a configured time has elapsed, the controller 150 detects the elapse of time in step 343. In addition, the controller 150 determines whether the color light 520 can be extended in step 345. The controller 150 may compare a current width and a threshold width of the color light 520. Herein, the threshold width may be configured in the storage unit 140. For example, the threshold width may exceed a width of the edge area 133.

Figures 13A, 13B:
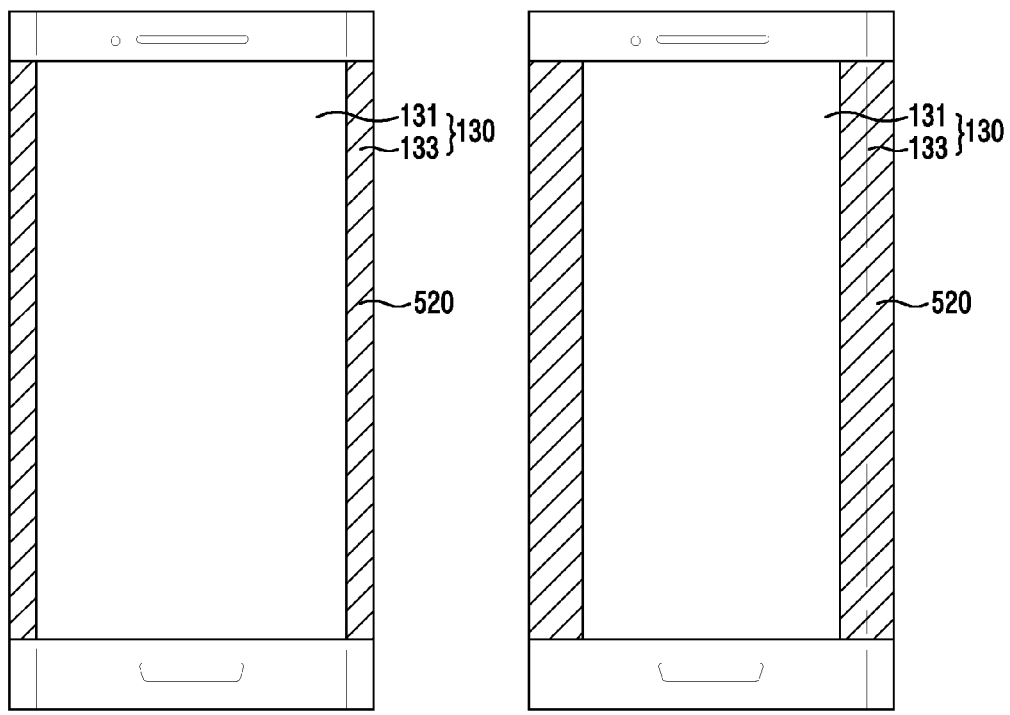

Next, when it is determined that the color light 520 can be extended in step 345, the controller 150 extends the color light 520 in step 347. When the current width of the color light 520 does not reach the threshold width, the controller 150 may determine that the color light 520 is allowed to be extended. Further, the controller 150 extends the color light 520 as shown in FIGS. 13A and 13B. For example, the controller 150 may extend a width of the color light 520 to correspond to a width of the edge area 133. Also, the controller 150 may extend the width of the color light 520 from the edge area 133 to the main area 131. That is, the controller 150 may execute control to display the color light 520 to the main area 131 as well as the edge area 133. The controller 150 may activate the main area 131. Herein, the controller 150 may activate part of the main area 131. Then, the controller 150 returns to step 345.

The controller 150 may repeat at least one of step 345 and step 347. Herein, until a current width of the color light 520 reaches a threshold width, the controller 150 may repeat steps 345 and 347. In addition, the controller 150 extends the color light 520 as shown in FIG. 13A and then extends the color light 520 as shown in FIG. 13B.

When it is determined that the color light 520 cannot be extended in step 345, the controller 150 returns to executing the operations shown in the flowchart in FIG. 4.

When it is determined that the current width of the color light 520 reaches the threshold width, the controller 150 does not extend the width of the color light 520. That is, the controller 150 maintains a width of the color light 520.

Figure 14:
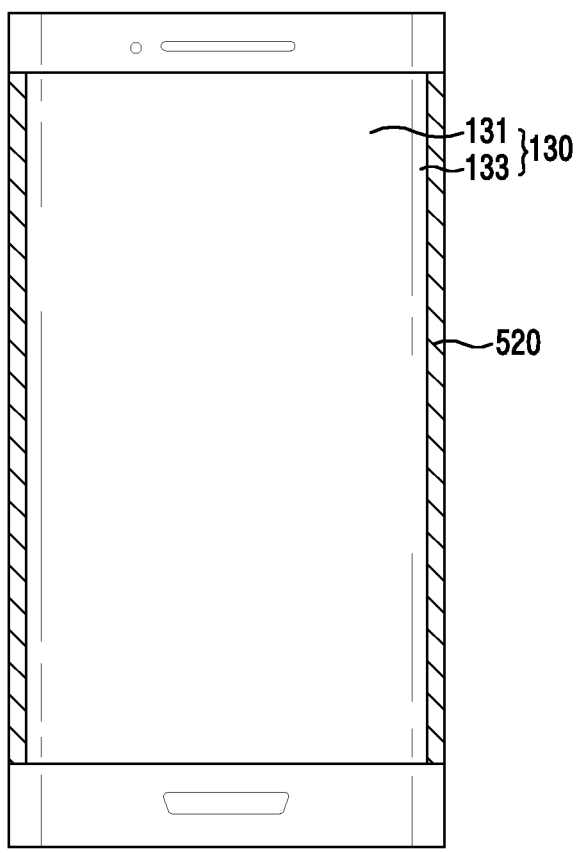

The controller 150 may repeat step 213. Herein, while the color light 520 is displayed in the edge area 133, another notification event may be generated. That is, as shown in FIGS. 11 and 12A, another notification event may be generated while the color light 520 is displayed in the edge area 133. The controller 150 may change the color light 520 in the edge area 133. Herein, the controller 150 may determine at least one of a color and a pattern corresponding to another notification event. Further, the controller 150 may execute control to display the color light 520 corresponding to another notification event. That is, the controller 150 executes control to display the color light 520 in the edge area 133 overall as shown in FIG. 14.

Figure 15:
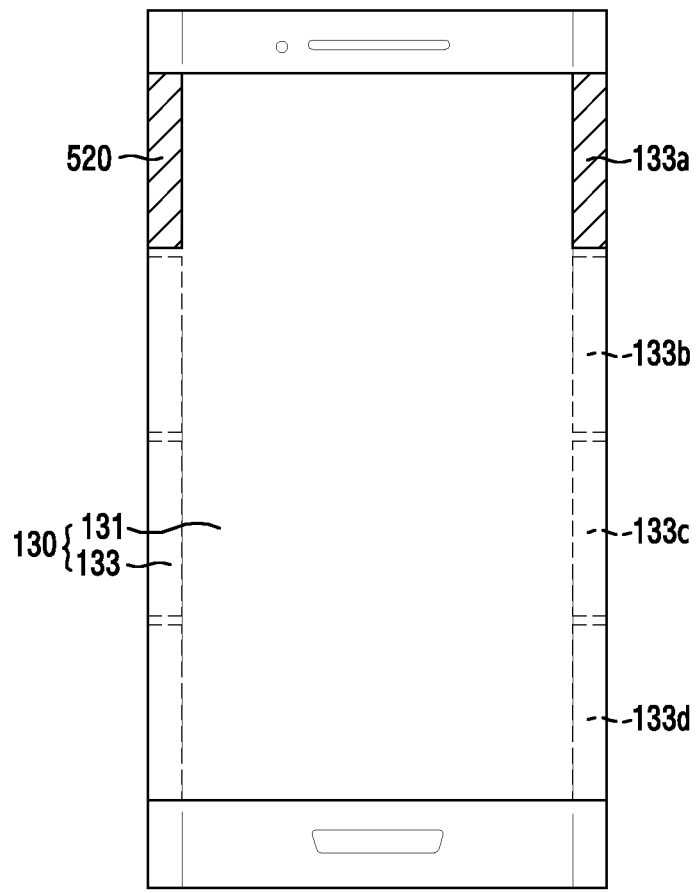

In an embodiment of the present disclosure, the controller 150 executing control to display the color light 520 in the edge area 133 overall has been described, but it is not limited thereto. The controller 150 executes control to partially display the color light 520 in the edge area 133 as shown in FIG. 15. Herein, the edge area 133 includes a plurality of sections 133a, 133b, 133c, and 133d. That is, the controller 150 executes control to display the color light 520 in one section among the sections 133a, 133b, 133c, and 133d of the edge area 133.

The controller 150 determines one section among the sections 133a, 133b, 133c, and 133d in accordance with the notification event in step 319 of FIG. 4. The controller 150 determines one section among the sections 133a, 133b, 133c, and 133d according to an attribute of the notification event. Further, the controller 150 determines one section among the sections 133a, 133b, 133c, and 133d according to a caller of the communication event. Herein, the sections 133a, 133b, 133c, and 133d may be configured in the storage unit 140, to correspond to a plurality of callers, respectively. To this end, the controller 150 may determine in the storage unit 140, one section among the sections 133a, 133b, 133c, and 133d according to the caller of the notification event, e.g., a first caller.

Figures 16A, 16B:
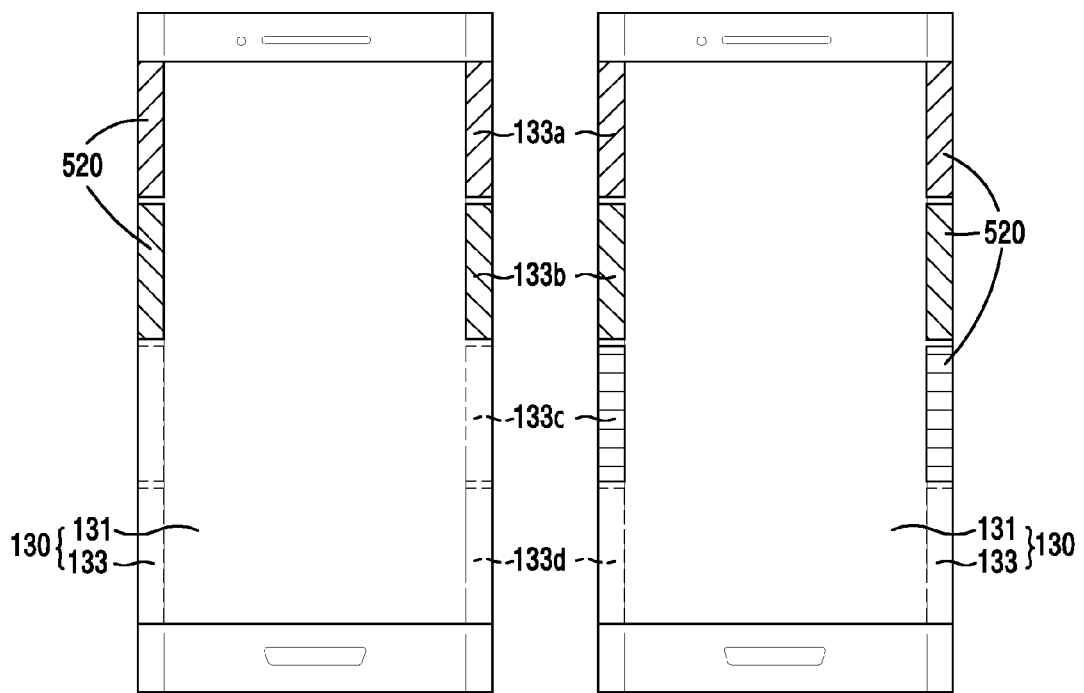

In an embodiment of the present disclosure, the controller 150 changes the color light 520 in the edge area 133 corresponding to another notification event, however, it is not limited thereto. That is, as shown in FIGS. 11, 12A, and FIG. 15, another notification event may be generated while the color light 520 is displayed in the edge area 133. The controller 150 determines, on the basis of the storage unit 140, one section among the sections 133a, 133b, 133c, and 133d in accordance to a caller of another notification event, e.g., a second caller. Accordingly, the controller 150 may additionally execute control to display the color light 520 in another one of the sections 133a, 133b, 133c, and 133d in the edge area 133 as shown in FIGS. 16A and 16B.

For example, as shown in FIGS. 11 and 12A, when the color light 520 is displayed in the edge area 133, the controller 150 may execute control to display the color light 520 to one section corresponding to the first caller among the sections 133a, 133b, 133c, and 133d of the edge area 133. In addition, the controller 150 may execute control to display the color light 520 to another section corresponding to the second caller among the sections 133a, 133b, 133c, and 133d of the edge area 133. When the color light 520 is displayed in one section corresponding the first caller among the sections 133a, 133b, 133c, and 133d of the edge area 133 as shown in FIG. 15, the controller 150 may execute control to display the color light 520 to another section corresponding to the second caller among the sections 133a, 133b, 133c, and 133d of the edge area 133.

When the movement of a touch from the edge area 133 to the main area 131 is generated, the controller 150 detects the movement in step 215. When the touch is generated in the edge area 133, the controller 150 detects the generated touch. Herein, the controller 150 may activate the input unit 120 corresponding to the main area 131. Then, when the movement of the touch from the edge area 133 to the main area 131 is generated, the controller 150 may detect the generated movement.

The controller 150 executes control to display data in the main area 131 in step 217. The controller 150 activates the main area 131. Herein, the controller 150 may activate a part of the main area 131. Further, the controller 150 may remove the color light 520 from the edge area 133. The controller 150 may execute control to display the notice window 530 in the main area 131. Herein, the controller 150 may extend the notice window 530 according to a movement path of the touch. Further, the controller 150 may execute control to display notice information in the notice window 530. The controller 150 may execute control to display an execution screen 540 of the function in the main area 131. Herein, referring to FIG. 7, an operation that the controller 150 executes control to display data in the main area 131 will be described in more detail.

Figure 7:
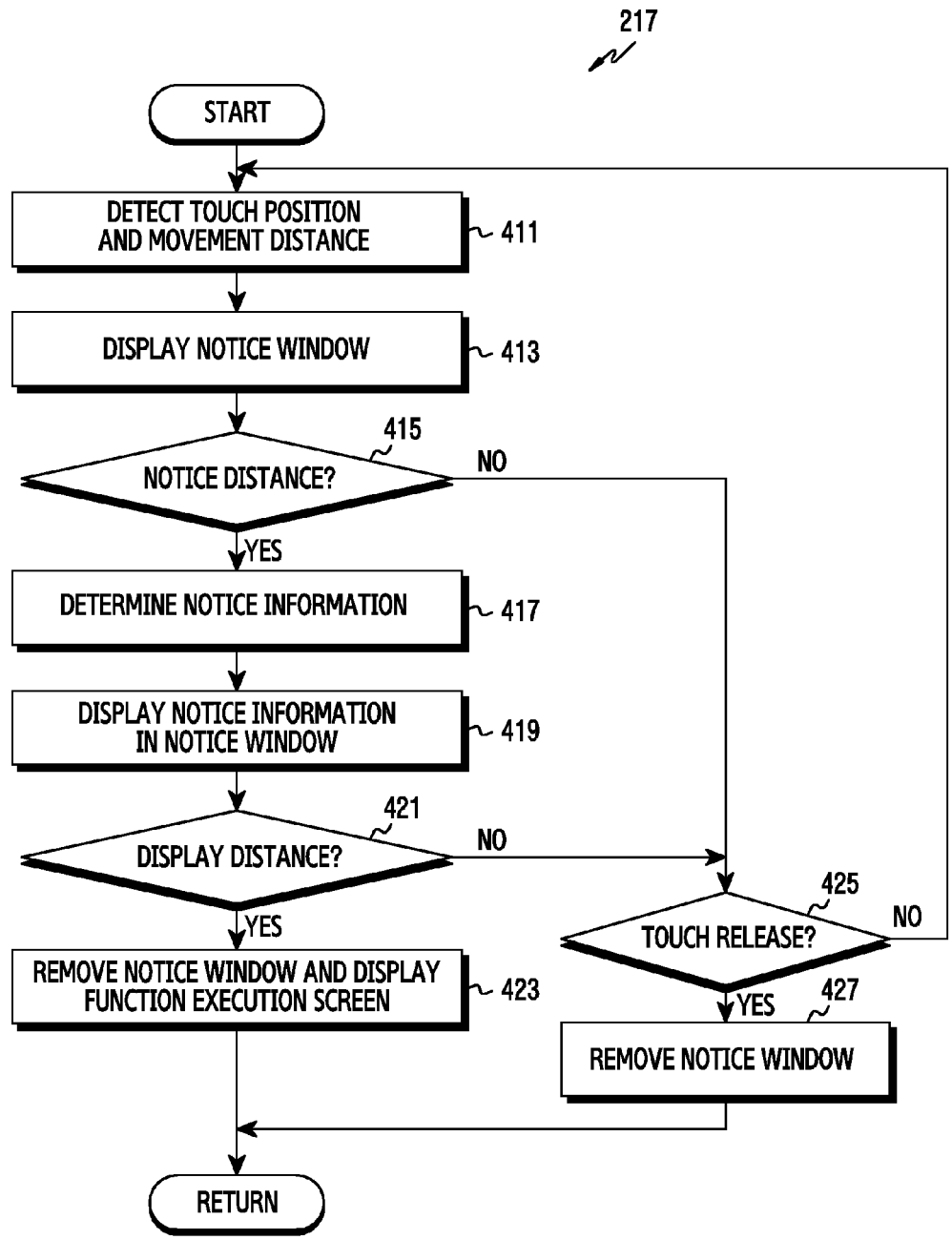
FIG. 7 is a flowchart illustrating an operation of displaying data to a main area of a display according to an embodiment of the present disclosure.

FIG. 7 is a flowchart illustrating the operation of displaying data to a main area of a display.

Referring to FIG. 7, the controller 150 detects a position and a movement distance of a touch in step 411. The controller 150 continuously detects positions of the touch. In addition, the controller 150 may detect the movement distance of the touch using the positions of the touch. Herein, the controller 150 may detect the movement distance of the touch by connecting the positions of the touch. Further, the controller 150 may detect the movement distance of the touch by connecting specific coordinate values, for example, x-axis coordinate values in the positions of the touch. The controller 150 determines the movement path of the touch. Herein, the controller 150 may determine the movement distance of the touch by connecting the positions of the touch.

Next, the controller 150 executes control to display the notice window 530 in the main area 131 in step 413. The controller 150 activates the main area 131. Herein, the controller 150 may activate a part of the main area 131. That is, the controller 150 may not activate the main area 131 overall and activate only a part of the main area 131. The controller 150 may extend the notice window 530 according to a movement path of the touch.

Next, the controller 150 determines whether the movement distance of the touch reaches a notice distance in step 415. That is, the controller 150 compares the movement distance of the touch with the notice distance. Herein, the notice distance may be configured in the storage unit 140. Further, the notice distance may include a plurality of configuration values. For example, the notice distance may be less than the width of the main area 131.

Next, when it is determined that the movement distance of the touch reaches the notice distance in step 415, the controller 150 determines the notice information corresponding to the color light 520 in step 417. The controller 150 may determine the notice information according to the position and the movement distance of the touch. Herein, the controller 150 may determine the notice information corresponding to one among configuration values of the notice distance. When the function is being executed, the controller 150 may determine at least a part of information of the function as the notice information. In addition, the controller 150 may determine at least a part of information of the notification event as the notice information. Further, the controller 150 may remove the color light 520 from the edge area 133. Then, the controller 150 executes control to display the notice information in the notice window 530 in step 419.

Next, the controller 150 determines whether the movement distance of the touch reaches a display distance in step 421. That is, the controller 150 compares the movement distance of the touch with the display distance. Herein, the display distance may be configured in the storage unit 140. For example, the display distance exceeds the notice distance and may be less than or equal to the width of the main area 131.

Next, when the movement distance of the touch reaches the display distance in step 421, the controller 150 removes the notice window 530 from the main area 131 in step 423. Further, the controller 150 executes control to display, in the main area 131, the execution screen 540 of the function corresponding to the color light 520. Herein, the controller 150 may activate the main area 131 overall. The execution screen 540 may be different according to the touch position. When the function is being executed, the controller 150 may execute control to display the execution screen 540 of a corresponding function. Further, the controller 150 may execute control to display the execution screen 540 of the function corresponding to the notification event. Even though the release of the touch is detected while the execution screen 540 is displayed, the controller 150 executes control to continuously display the execution screen 540. Then, the controller 150 returns to executing the operations shown in the flowchart in FIG. 3.

When the color light 520 is displayed in the edge area 133 corresponds to a health care function, the controller 150 may execute control to output display data in the main area 131 as shown in FIGS. 17A-17H.

Figure 17A:
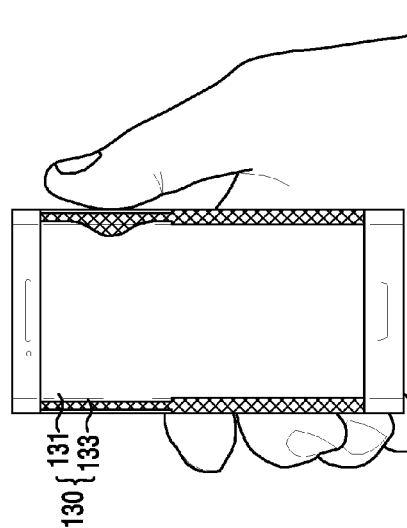
Figure 17B:
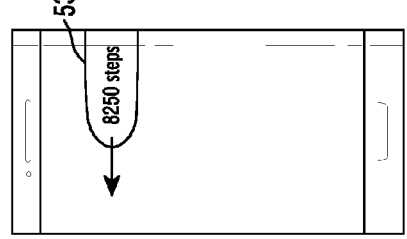
Figure 17C:
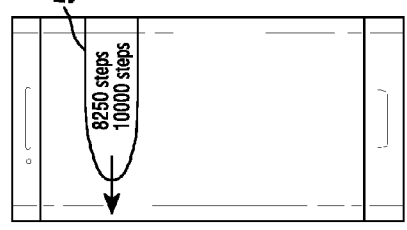
Figure 17D:
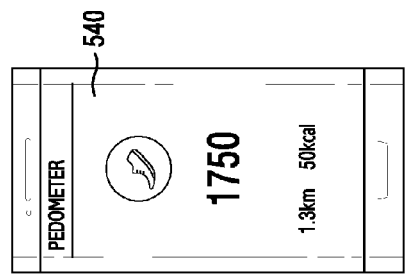

That is, when a movement of a touch has been detected in the upper half of the main area 131 as shown in FIG. 17A, the controller 150 extends the notice window 530 in the upper half of the main area 131 according to a movement distance of the touch as shown in FIGS. 17B and 17C. Herein, the controller 150 executes control to display notice information on the remaining section in the progress state of the health care function. For example, the controller 150 may display the remaining step count in comparison with a goal step count in the notice window 530 as shown in FIG. 17B. When the movement distance of the touch increases, the controller 150 adds and displays the goal step count in the notice window 530 as shown in FIG. 17C. Further, when the movement distance of the touch increases, the controller 150 executes control to display an execution screen 540 of the health care function as shown in FIG. 17D.

Figure 17E:
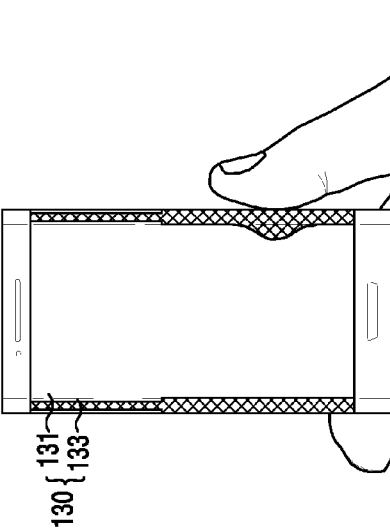
Figure 17F:
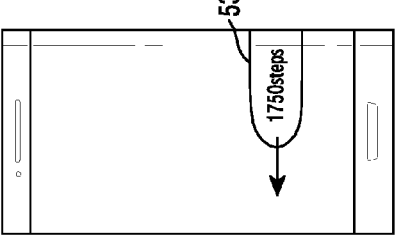
Figure 17G:
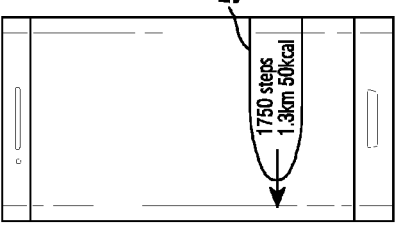
Figure 17H:
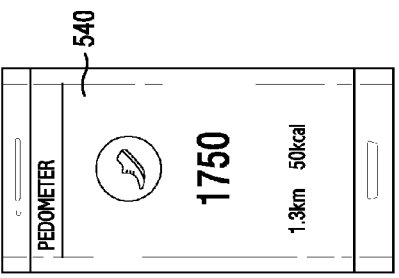

When a movement of a touch has been detected in the lower half of the main area 131 as shown in FIG. 17E, the controller 150 extends the notice window 530 in the lower half of the main area 131 according to a movement distance of the touch as shown in FIGS. 17F and 17G. Herein, the controller 150 determines notice information on the progression section in the progress state of the health care function. For example, the controller 150 executes control to display a current step count in the notice window 530 as shown in FIG. 17F. When the movement distance of the touch increases, the controller 150 executes control to add and display a distance and a calorie consumption amount, which are calculated from the current step count, in the notice window 530 as shown in FIG. 17G. Further, when the movement distance of the touch increases, the controller 150 executes control to display the execution screen 540 of the health care function as shown in FIG. 17H.

When the color light 520 is displayed in the edge area 133 corresponding to a data download function, the controller 150 executes control to display data in the main area 131 as shown in FIG. 18.

Figure 18A:
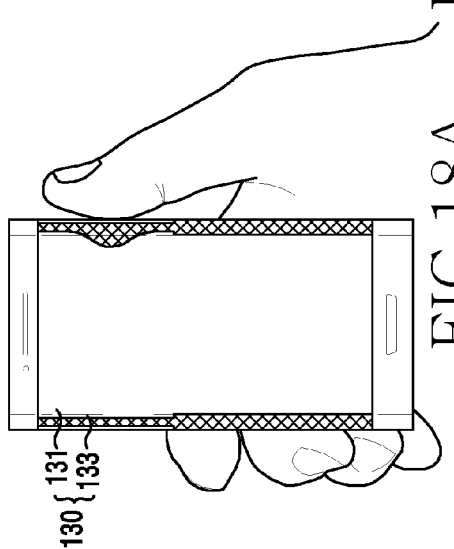
Figures 18B, 18C, 18D:
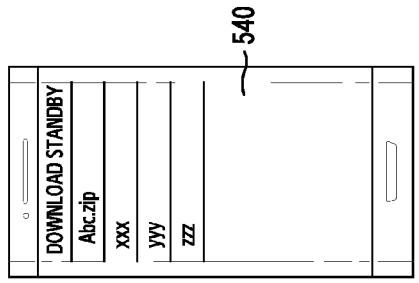

That is, when a movement of a touch has been detected in the upper half of the main area 131 as shown in FIG. 18A, the controller 150 extends the notice window 530 in the upper half of the main area 131 according to a movement distance of the touch as shown in FIGS. 18B and 18C. Herein, the controller 150 executes control to display notice information on the remaining section in the progress state of the data download function. For example, the controller 150 executes control to display identification information and the remaining amount of a downloaded folder in the notice window 530 as shown in FIG. 18B. When the movement distance of the touch increases, the controller 150 executes control to add and display the remaining time in the notice window 530 as shown in FIG. 18C. Further, when the movement distance of the touch increases, the controller 150 executes control to display an execution screen 540 of the data download function as shown in FIG. 18D.

Figure 18E:
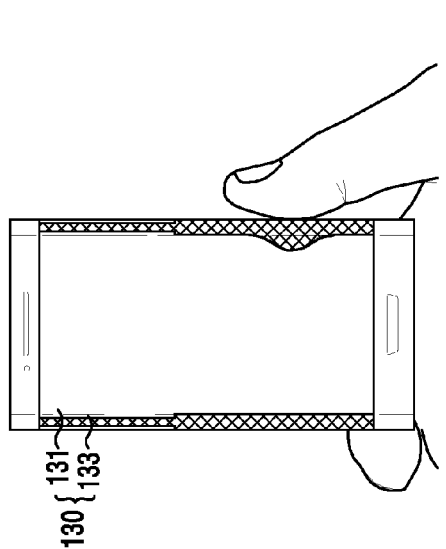
Figures 18F, 18G, 18H:
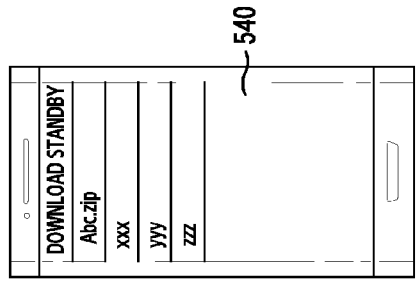

When a movement of a touch has been detected in the lower half of the main area 131 as shown in FIG. 18E, the controller 150 extends a notice window 530 in the lower half of the main area 131 according to a movement distance of the touch as shown in FIGS. 18F and 18G. Herein, the controller 150 determines notice information on a progression section in the progress state of the data download function. For example, the controller 150 executes control to display identification information and a progression amount of a downloaded folder in the notice window 530 as shown in FIG. 18F. When the movement distance of the touch increases, the controller 150 executes control to add and display a size of the downloaded folder in the notice window 530 as shown in FIG. 18G. Further, when the movement distance of the touch increases, the controller 150 executes control to display an execution screen 540 of the data download function as shown in FIG. 18H.

When the color light 520 is displayed in the edge area 133 corresponding to a timer function, the controller 150 executes control to display data in the main area 131 as shown in FIG. 19.

Figure 19A:
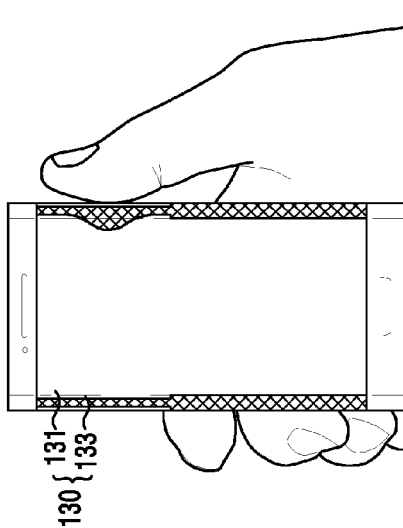
Figure 19B:
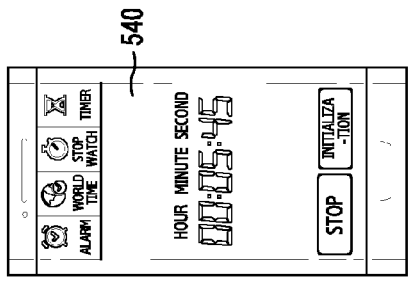
Figure 19C:
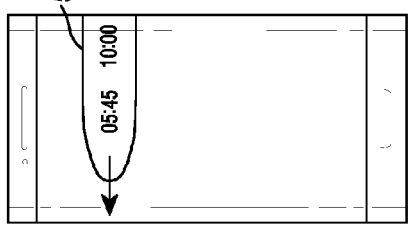
Figure 19D:
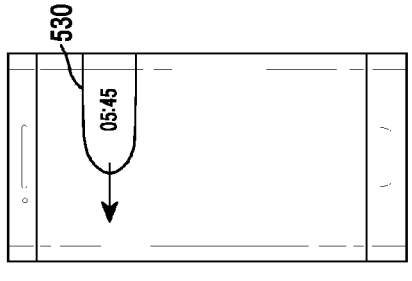

That is, when a movement of a touch has been detected in the upper half of the main area 131 as shown in FIG. 19A, the controller 150 extends the notice window 530 in the upper half of the main area 131 according to a movement distance of the touch as shown in FIGS. 19B and 19C. Herein, the controller 150 determines notice information on the remaining section in the progress state of the timer function. For example, the controller 150 executes control to display the remaining time in the notice window 530 as shown in FIG. 19B. When the movement distance of the touch increases, the controller 150 executes control to add and display a goal time in the notice window 530 as shown in FIG. 19C. Further, when the movement distance of the touch increases, the controller 150 executes control to display an execution screen 540 of the timer function as shown in FIG. 19D.

Figure 19E:
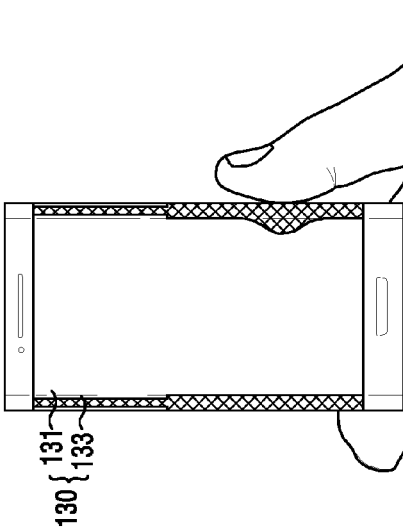
Figure 19F:
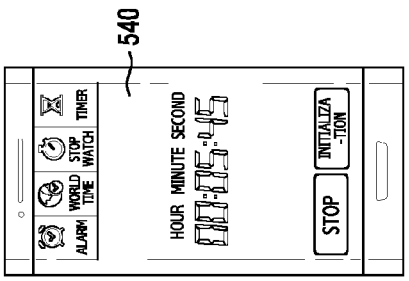
Figure 19G:
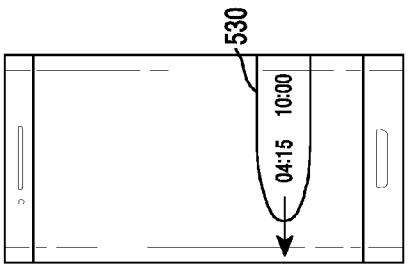
Figure 19H:
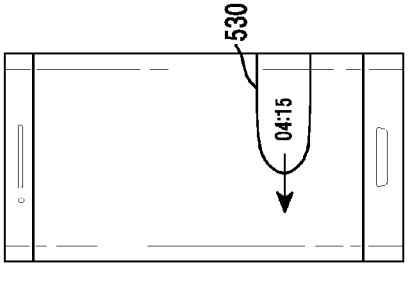

When a movement of a touch has been detected in the lower half of the main area 131 as shown in FIG. 19E, the controller 150 extends the notice window 530 in the lower half of the main area 131 according to a movement distance of the touch as shown in FIGS. 19F and 19G. Herein, the controller 150 determines notice information on a progression section in the progress state of the timer function. For example, the controller 150 executes control to display a progression time in the notice window 530 as shown in FIG. 19F. When the movement distance of the touch increases, the controller 150 executes control to add and display a goal time in the notice window 530 as shown in FIG. 19G. Further, when the movement distance of the touch increases, the controller 150 executes control to display an execution screen 540 of the timer function as shown in FIG. 19H.

When the color light 520 is displayed in the edge area 133 corresponding to a file reproduction function, the controller 150 executes control to display data in the main area 131 as shown in FIG. 20.

That is, when a movement of a touch has been detected in the upper half of the main area 131 as shown in FIG. 20A, the controller 150 extends the notice window 530 in the upper half of the main area 131 according to a movement distance of the touch as shown in FIGS. 20B and 20C. Herein, the controller 150 determines notice information on the remaining section in the progress state of the file reproduction function. For example, the controller 150 executes control to display a file name and the remaining time in the notice window 530 as shown in FIG. 20B. When the movement distance of the touch increases, the controller 150 executes control to add and display a total reproduction time in the notice window 530 as shown in FIG. 20C. Further, when the movement distance of the touch increases, the controller 150 executes control to display an execution screen 540 of the file reproduction function as shown in FIG. 20D.

When a movement of a touch has been detected in the lower half of the main area 131 as shown in FIG. 20E, the controller 150 extends a notice window 530 in the lower half of the main area 131 according to a movement distance of the touch as shown in FIGS. 20F and 20G. Herein, the controller 150 determines notice information on a progression section in the progress state of the file reproduction function. For example, the controller 150 executes control to display a file name and a progression time in the notice window 530 as shown in FIG. 20F. When the movement distance of the touch increases, the controller 150 executes control to add and display a total reproduction time in the notice window 530 as shown in FIG. 20G. Further, when the movement distance of the touch increases, the controller 150 executes control to display an execution screen 540 of the file reproduction function as shown in FIG. 20H.

When the color light 520 is displayed in the edge area 133 corresponding to message reception, the controller 150 executes control to display data in the main area 131 as shown in FIG. 21.

That is, when a movement of a touch has been detected in the upper half of the main area 131 as shown in FIG. 21A, the controller 150 extends the notice window 530 in the upper half of the main area 131 according to a movement distance of the touch as shown in FIGS. 21B and 21C. Herein, the controller 150 determines notice information corresponding to a message. For example, the controller 150 executes control to display identification information in the notice window 530 as shown in FIG. 21B. When the movement distance of the touch increases, the controller 150 executes control to add and display at least a part of a message content in the notice window 530 as shown in FIG. 21C. Further, when the movement distance of the touch increases, the controller 150 executes control to display an execution screen 540 of a message exchange function as shown in FIG. 21D.

When a movement of a touch has been detected in the lower half of the main area 131 as shown in FIG. 21E, the controller 150 executes control to display the execution screen 540 of the message exchange function as shown in FIG. 21F. Herein, the controller 150 executes control to add and display a keypad 550 on the execution screen 540.

When the movement distance of the touch does not reach the notice distance in step 415, the controller 150 executes control to continuously display the notice window 530 in the main area 131. Similarly, when the movement distance of the touch does not reach the display distance in step 421, the controller 150 executes control to continuously display the notice window 530 in the main area 131. When the touch is released in the main area 131, the controller 150 detects the release of the touch in step 425. Further, the controller 150 removes the notice window 530 from the main area 131 in step 427. That is, when the touch is released in moving in the main area 131, the controller 150 removes the notice window 530 from the main area 131. The controller 150 may again deactivate the main area 131. After the movement of the touch reaches the notice distance, when the touch is released, the controller 150 may continuously output the color light 520 in the edge area 133. Then, the controller 150 returns to executing the operations shown in the flowchart of FIG. 3.

When deactivation of the main area 131 has not been detected in step 211, the controller 150 performs a corresponding function in step 221. The controller 150 executes control to continuously display a display screen in the main area 131 as shown in FIG. 8. Herein, the controller 150 executes control to perform a function and continuously display an execution screen 510 of the function in the main area 131. The controller 150 may configure and change various pieces of configuration information as new information. For example, the controller 150 may configure and change the configuration information as new information corresponding to a user input.

According to an embodiment of the present disclosure, the display unit 130 of the electronic device 100 includes the main area 131 and the edge area 133. When the main area 131 is deactivated, the electronic device 100 displays a color light through the edge area 133, thereby providing a notice for the information. Therefore, it can prevent causing annoyance to a person who is not a user of the electronic device 100. Further, it can help secure the information and prevent the information from being exposed to a person who is not the user of the electronic device 100. Further, the electronic device 100 may apply a color, a pattern, or a position in the edge area 133 to the color light, thereby distinguishing the information. Accordingly, the electronic device 100 can effectively provide a notice for the information. Therefore, the electronic device 100 may efficiently display the information.

Embodiments of the present disclosure are shown and described in this specification and the drawings corresponding to specific examples presented in order to easily explain technical contents of the present disclosure, and to help comprehension of the present disclosure are not intended to limit the scope of the present disclosure That is, it is obvious to those skilled in the art to which the present disclosure belongs that different modifications can be achieved based on the technical spirit of the present disclosure. Therefore, the scope of the present disclosure should not be defined as being limited to the embodiments, but should be defined by the appended claims and their equivalents.

What is claimed is:

1. An electronic device comprising:
   a touch screen display unit including a main area and an edge area which is extended from the main area; and
   a controller coupled to the touch screen display unit,
   wherein the controller is configured to:
   when a main area of a touch screen display unit of the electronic device is deactivated and a function is being executed in the electronic device:
   determine a color corresponding to the function being executed in the electronic device, and
   output a progression state of the function on the edge area using the determined color by controlling the touch screen display unit to display a current state of progression with a first section of the edge area, and
   when a notification event is detected:
   determine at least one section of the touch screen display unit corresponding to the notification event among a plurality of sections into which the edge area is divided, and
   control the touch screen display unit to inform a user of an event corresponding to the notification event by displaying the determined section, wherein the edge area is extended from the main area in a front surface of the electronic device and tilted towards a rear surface of the electronic device.

2. The electronic device of claim 1, wherein the plurality of sections correspond to predetermined callers according to a position in the edge area.

3. The electronic device of claim 2, wherein the controller is configured to determine a caller corresponding to the notification event and determine at least one section corresponding to the determined caller among the plurality of sections.

4. The electronic device of claim 1, wherein the plurality of sections correspond to predetermined colors.

5. The electronic device of claim 3, wherein the controller is
configured to detect a touch movement from the determined section to the main area and execute control to display a notice window having notice information of the notification event in the main area.

6. The electronic device of claim 5, wherein the notice window is extended according to a movement path of the touch in the main area.

7. The electronic device of claim 5, wherein the controller is configured to remove the notice window from the main area and execute control to display an execution screen of a function corresponding to the notification event in the main area.

8. The electronic device of claim 5, wherein the notice information includes identification information of the determined caller.

9. The electronic device of claim 1, wherein the controller is configured to activate the main area and execute control to display a notice window having notice information of the notification event in the main area.

10. The electronic device of claim 1, further comprising:
a communication unit functionally connected to the controller,
wherein the notification event includes at least one among a call, an email, or a message.

11. A method of an electronic device comprising:
when a main area of a touch screen display unit of the electronic device is deactivated and a function is being executed in the electronic device:
determining a color corresponding to the function being executed in the electronic device; and
outputting a progression state of the function using the determined color by displaying a current state of progression with a first section of an edge area of the touch display unit; and
when a notification event is detected:
determining at least one section of the touch screen display unit corresponding to the notification event among a plurality of sections of the edge area of the touch screen display unit; and
notifying a user of an event corresponding to the notification event using the determined section,
wherein the edge area is extended from the main area in a front surface of the electronic device and tilted towards a rear surface of the electronic device.

12. The method of claim 11, wherein the plurality of sections correspond to predetermined callers according to a position in the edge area.

13. The method of claim 12, wherein determining the at least one section comprises:
determining a caller corresponding to the notification event; and
determining at least one section of the display unit corresponding to the determined caller among the plurality of sections.

14. The method of claim 11, wherein the plurality of sections correspond to predetermined colors.

15. The method of claim 13, further comprising:
detecting a touch movement from the determined section to the main area; and
displaying a notice window having notice information of the notification event in the main area.

16. The method of claim 15, wherein displaying the notice window comprises extending the notice window according to a movement path of the touch in the main area.

17. The method of claim 15, further comprising:
removing the notice window in the main area; and
displaying an execution screen of a function corresponding to the notification event in the main area.

18. The method of claim 15, wherein the notice information includes identification information of the determined caller.

19. The method of claim 11, further comprising:
activating the main area; and
displaying a notice window having notice information of the notification event in the main area.

20. The method of claim 11, wherein the notification event includes at least one of a call, an email, or a message.

* * * * *